United States Patent [19]
Szilagyi

[11] Patent Number: 4,569,153
[45] Date of Patent: Feb. 11, 1986

[54] ERADICATION OF PHREATOPHYTES AND PRESERVATION OF GROUND WATER

[76] Inventor: Elsie Szilagyi, 14318 Parnell Ave., Harvey, Ill. 60426

[21] Appl. No.: 580,103

[22] Filed: Feb. 14, 1984

[51] Int. Cl.⁴ .............................................. A01G 1/00
[52] U.S. Cl. ........................................... 47/58; 47/29; 47/21
[58] Field of Search .................... 47/58, 20–21, 47/26–29

[56] References Cited

U.S. PATENT DOCUMENTS

| | | | |
|---|---|---|---|
| 198,159 | 12/1877 | Schermerhorn | 47/26 X |
| 1,615,589 | 1/1927 | Lewis | 47/28 |
| 2,005,326 | 6/1935 | Schindler | 47/26 X |
| 2,691,848 | 10/1954 | Arena | 47/26 |
| 3,384,992 | 5/1968 | Heffron | 47/29 |
| 3,466,799 | 9/1969 | Stilson | 47/21 |

Primary Examiner—Robert E. Bagwill
Attorney, Agent, or Firm—Richard G. Kinney

[57] ABSTRACT

The eradication of phreatophytes by enclosing them in transparent or translucent moisture-proof covers, thereby resulting in cessation of transpiration.

6 Claims, 6 Drawing Figures 4,569,153

ERADICATION OF PHREATOPHYTES AND PRESERVATION OF GROUND WATER

BACKGROUND OF THE INVENTION

1. Field of the Invention

The present invention is directed to improvements for killing phreatophytes, especially *tamarix pentandra,* and for preserving ground water in arid areas infested with such plants.

2. Description of the Prior Art

In arid climates, such as the southwestern United States, useful ground water is constantly removed by large-scale infestation of phreatophytes. A particular widespread offending plant in large areas of New Mexico and Arizona is *tamarix pentandra,* commonly known as the salt cedar. This plant was originally introduced to this area from the Mediterranean as an exotic ornamental in the 1920s. Used for a time for erosion control, it has now grown wild and spread along the river systems of the southwestern states, notably parts of California, Arizona, New Mexico and Texas.

This phreatophyte taps ground water and by transpiration expels it into the above-ground atmosphere. Various studies have been done on the large quantity of water that such plants remove from the ground. Some of these studies are summarized in "Assorted Phreatophyte Water-Use Studies" published as "Appendix J" in the appendix to "Final Environmental Impact Statement Operation and Maintenance Program for the Rio Grande—Velarde to Caballo Dam, Rio Grande and Middle Rio Grande Projects", U.S. Department of the Interior Bureau of Reclamation.

An early survey of the problem caused by this and like plants occurred during the hearings of the Senate Select Committee on Water Problems in 1958, and since then numerous studies and attempts at amelioration of the problem have been undertaken, primarily by the use of herbicides, burning and ploughing.

Herbicides pose hazards both obvious and subtle, not only to mankind directly, but also to the ecology on which all life depends. The chief objection of the water conservation people is that herbicides are spread from crop-dusting planes and tend to drift over onto adjoining ranch and farm land, engendering lawsuits. Also, certain long-lived herbicides tend to be washed into the ground water by the occasional rains in the areas and harm the very water that the users are attempting to preserve.

Burning, unfortunately, does not usually work. The wood tissue of the plant is so permeated with water and carbon dioxide that it must be sprayed with oil before it will burn. This procedure is relatively expensive, but even so, only a very occasional individual plant of exactly the right characteristics will succumb. Most burnt plants will put up new growth in the following year and in four or five years will have regained original size.

The only consistently reliable prior art method or eradication is ploughing, but as the salt cedar has a decided affinity for swampy, soggy locations, it is not physically possible to reach a high percentage of the plant population with heavy equipment. The giant ploughs necessary to do this work are very expensive and the work itself is rough on the equipment.

SUMMARY OF THE INVENTION

The present invention provides an ecologically safe, effective and economically efficient method of killing arid phreatophytes such as the salt cedar, which method overcomes one or more of the above-mentioned disadvantages of prior methods. Thus, in accordance with the present invention, phreatophytes are destroyed through the successive steps of first identifying the phreatophytes; second, enclosing essentially all of the above-ground fronds and stems of the plant with an essentially water/vapor-proof envelope that fits closely about the entire periphery of the phreatophyte; and third, maintaining that enclosure about the phreatophyte for a period of time so as to irreversibly reverse its life cycle.

The invention has been tested in field conditions and has killed salt cedars in as little as five days.

When it is enveloped in accordance with the present invention, the phreatophyte transpires water vapor into the closed environment about the above-ground part of the plant, raising the vapor pressure and humidity to the point where the plant can no longer maintain transpiration. It is believed that the salt cedar and similar phreatophytes must transpire to live and rely on the flow of water to bring nutrients to its root crown as well as its above-ground parts. Thus, the present invention works by preventing transpiration, causing the entire plant to figuratively choke on its own excretions of moisture and carbon dioxide and die, root crown and all.

DETAILED DESCRIPTION OF THE DRAWINGS

Figure 1:
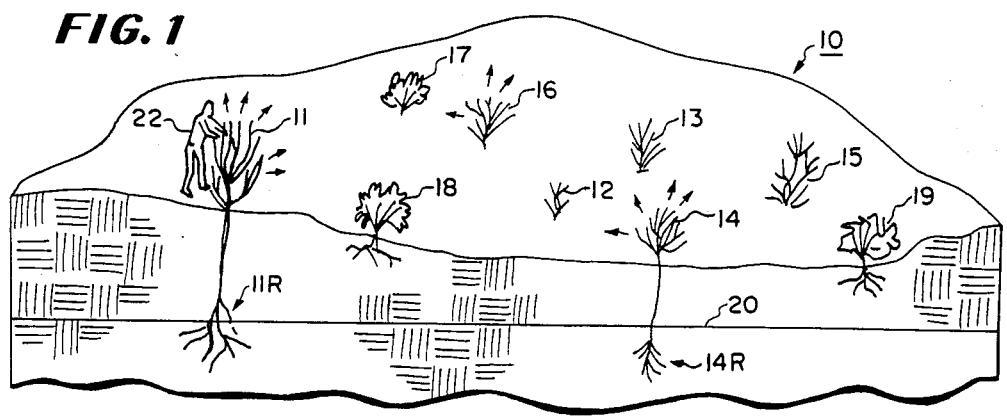
FIG. 1 is a perspective view, partly in section, of a portion of land bearing phreatophytes and other plants and illustrating the conditions to be corrected and the first step in the method of correcting them in accordance with the present invention.

Referring to FIG. 1, there is depicted, partly in section, a more-or-less typical segment of land 10 infested with a number of salt cedar plants 11 through 16. Several non-phreatophyte native plants, 17, 18 and 19 are also shown. The phreatophic salt cedars have root crowns such as those indicated at 11R and 14R that descend down to the water table 20 and draw up water which is transpired into the arid above-ground atmosphere.

Such phreatophytes are believed to live primarily by transpiration, extracting nutrients from ground water. In this way, they differ from the generally more useful plants 17 through 19, whose more transverse root systems rely on nutrients extracted from the ground and occasional rainfall.

The overall effect of widespread infestation of phreatophytes is to raise somewhat the humidity of the dry desert air above ground at the expense of lowering the water table. It is generally considered socially desirable to keep water in the ground for use for agriculture, herding, and people.

To raise the water level and prevent such loss of ground water, the present invention provides the process of first identifying the phreatophytes to be removed. This can be done by a "blazer" 22 who walks or rides over the area marking the selected plants in a suitable manner such as spray-painting a marking on them.

In the salt cedar swamps along the river bottoms, growth is usually so jungle-dense that it would be impossible to install anything over a specific plant without first cleaning enough surrounding area so that workmen could circumnavigate the tree. It It would be desirable at this point to clean up as much of the debris on the ground as possible. Otherwise, new seedlings will start the following year. (This plant produces seed most prolificly.) The cut plants will, of course, regrow, but can be killed as soon as they have attained a size in approximate balance with the size of the root crown.

Figure 2:
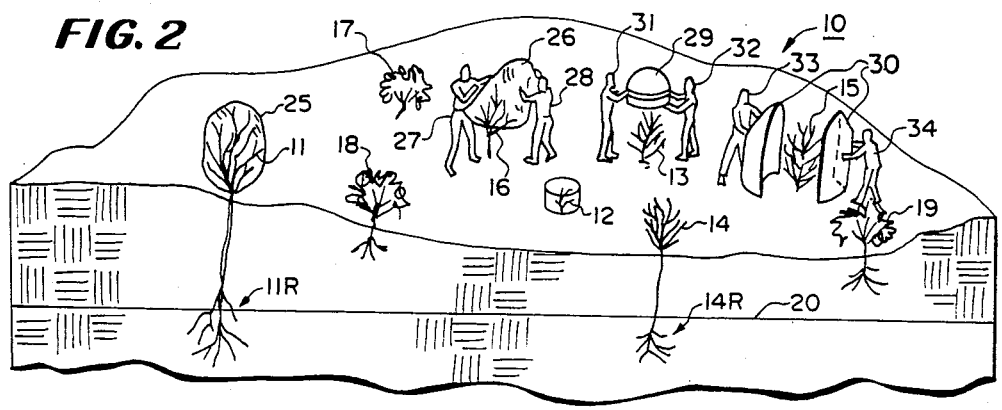
FIG. 2 is a view similar to that of FIG. 1 of the same area being treated in accordance with the second step of the present invention by having close-fitting envelopes of various types placed over and about the phreatophytes.

Next, as shown in FIG. 2, the above-ground portions of the phreatophytes are enveloped in a closely-fitting transparent or translucent water/vapor-proof envelope. Suitable materials are plastic sheeting 25 and 26 in bag-like configuration, which may be applied over the plant as shown being done by workmen 27, 28 in FIG. 2. Such envelopes should be sized to closely approximate the outer periphery of the foliage of the plants. Thus, a plurality of sizes should be available during the systematic application over an area.

Alternatively or in addition, semi-rigid enclosures may be employed, such as the enclosures 29 and 30 being applied by the workmen 31, 32 and 33, 34 to plants 13 and 15 in FIG. 2. These enclosures or envelopes 29 and 30 are preferably nestable together so as to be easily transported and used. Small seedlings of the salt cedar can be covered by similar envelopes, such as cut-off, used transparent plastic bottles.

Experience has shown that the plastic sheeting should be relatively thick and strong, e.g., 3 mils. or 4 mils thick, when sheeting is used. Care should taken to select a period of low winds and expected good weather to install plastic sheeting envelopes.

It is important that the materials used are transparent or translucent. It is believed that the use of opaque material (such as the black or green plastic sheeting commonly used in agriculture for weed control) would, by cutting off light, cause the plant to go into a temporarily dormant state, as happens when the plant is cut or burned down.

The primary requirement of the envelopes is that they closely enclose the plant's fronds and stems and create a miniature closed environment thereabout. The bottoms should be closely conformed at the ground level, as by a closely drawn encircling cord or tape with a plastic sheeting envelope.

For maximum effectiveness in the shortest time, the present method should be used during the main growing season of the plants, which in the southwestern U.S. is April to September. During this time more than any other, the phreatophyte is transpiring ground water at a great pace. The water vapor transpired by the enveloped phreatophyte raises the humidity in the closed environment to the point where transpiration can no longer occur. Thus, the plant, in effect, is transplanted to a high humidity environment in which it cannot survive. In one experiment with about a 7-foot salt cedar in July in Ariz., the envelope gathered condensation of several gallons of transpired water in 45 minutes. By the fifth day of maintained close environment, no additional water was condensing and the salt cedar had apparently stopped transpiration, its foliage was turning brown and wilting, indicating probable cessation of photosynthesis and death of the plant.

Figure 3:
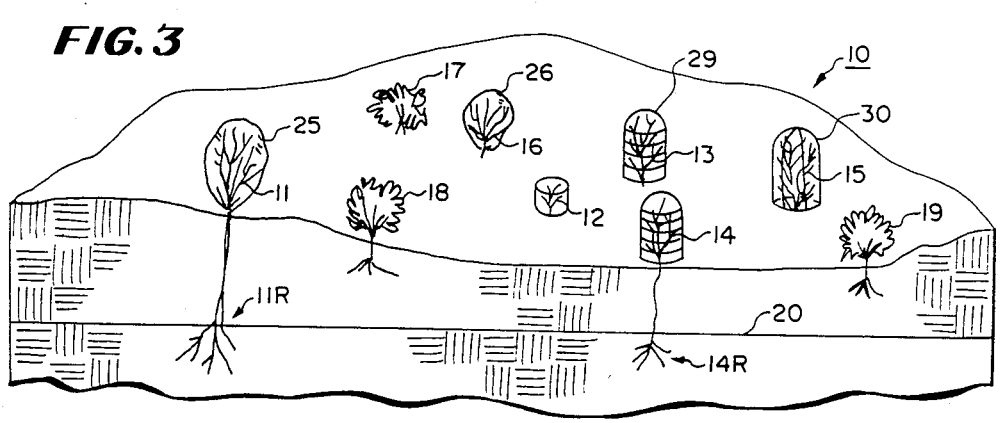
FIG. 3 is a view similar to that of FIGS. 1 and 2 of the same area at a later time than that depicted in FIG. 2, in accordance with the third major step of the present invention, showing the envelopes in place, and the phreatophytes in the process of wilting and dying.

Thus, by maintaining the environment closed as shown in FIG. 3 in as short a time as five days, the phreatophyte will wilt and die. Since the movement of water through the plant has stopped, the entire plant dies, roots and all.

After the death of the plants, the envelopes 25, 29, 30 on them can be removed and reused. In the case of the plastic sheeting 25, 26, it may be more economical to treat the sheeting as disposable. However, the more durable envelopes such as 29 and 30 can be reused.

Figure 4:
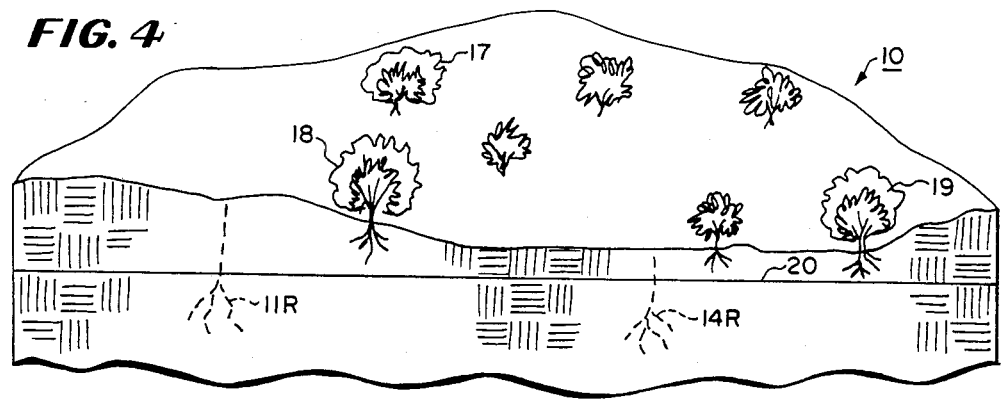
FIG. 4 is a view similar to that of FIGS. 1 through 3 of the same area, several months later than that depicted in FIG. 3, after the removal of the envelopes and the removal of the phreatophyte remains, illustrating the effect of the invention.

Because there will be a large quantity of viable seed on the ground as well as dried wood, best results would be had if a thorough cleanup were done as a final step in the process. (This woody fiber contains so much carbon dioxide that one believes it would make particularly good compost plant food.) This should yield the result depicted in FIG. 4 wherein non-phreatophytes have increased their distribution and the water table has risen. Of course, to affect the water table significantly, the phreatophyte infestation over a large area must be eradicated and preferably over, e.g., an entire river basin. If done thoroughly, the eradication will be complete and permanent since the present method destroys the entire plant.

Figure 5:
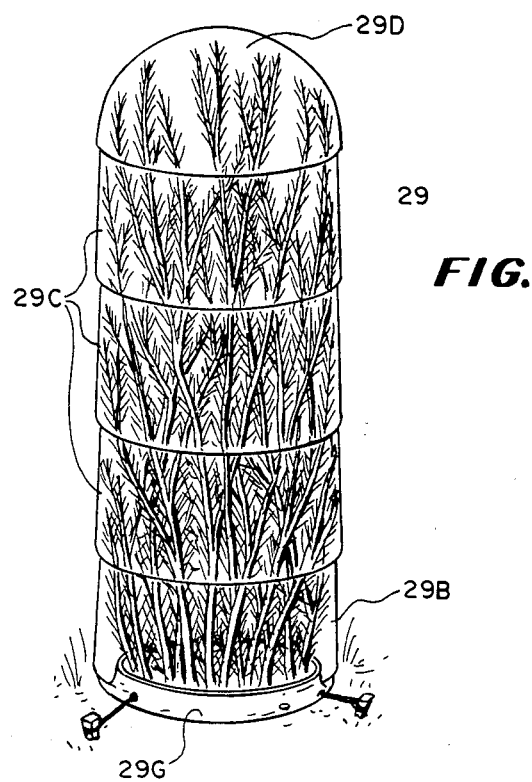
FIG. 5 is a perspective view of one type of envelope in use on a phreatophyte, which envelope is constructed and used in accordance with the present invention.

Referring to FIG. 5, the envelope 29 is shown in more detail and can be seen to comprise a domed top segment 29D and a plurality of rings or cylindrical segments 29C and a bottom segment 29B. The latter has an integral gutter 29G which serves to catch and hold water. The segments are fit tightly together and the cylinders are preferably formed with interlocking edges.

Figure 6:
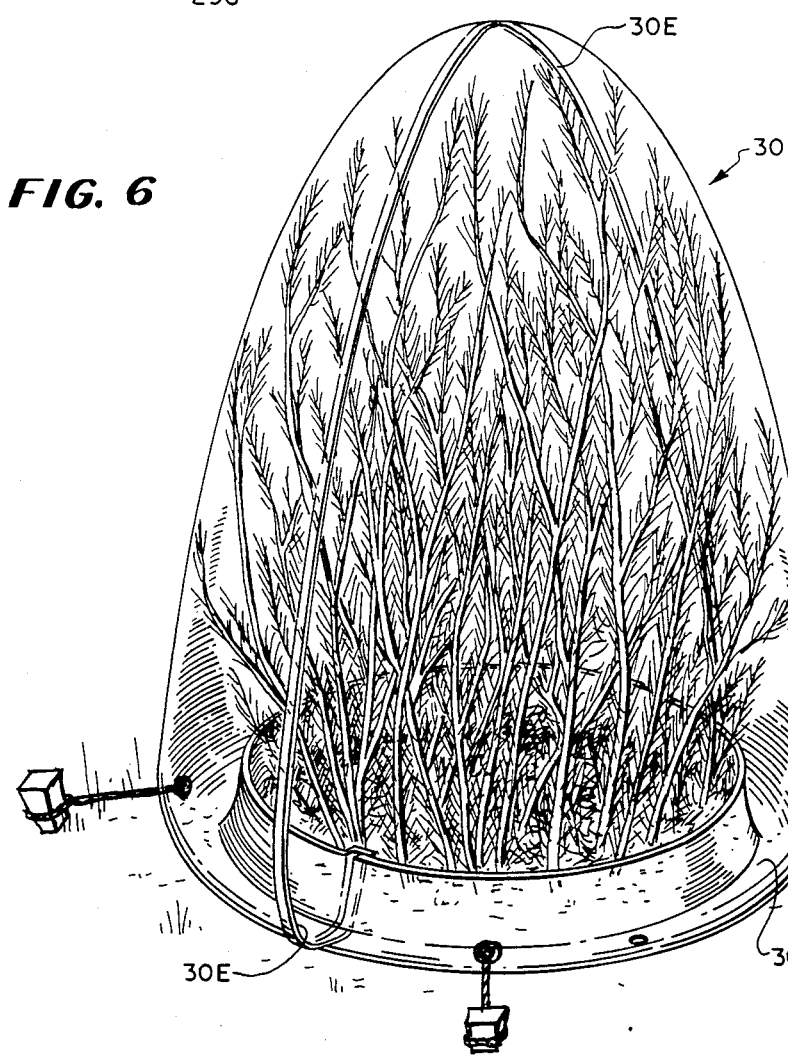
FIG. 6 is a perspective view of another type of envelope in use on a phreatophyte, which envelope is constructed and used in accordance with the present invention.

As shown in FIG. 6, the two-part envelope 30 also preferably has a gutter 30G and tightly fitting edges 30E.

Plastic tape may be used in both envelopes to better seal the joints.

Both of these rigid envelopes of FIGS. 5 and 6 have the advantage of being easily stackable for storage, transportation and handling.

It should now be apparent that an ecologically safe, relatively inexpensive and novel method for destroying phreatophytes has been disclosed. The materials employed can be reused indefinitely. Further, unlike all other mass methods which destroy desirable native growth along with the undesirable and leave the denuded earth highly subject to erosion and evaporation by capillary action, the present method can be controlled as precisely as needed to destroy only undesirable phreatophytes and to preserve desirable plants.

While several embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. A Method of killing unwanted phreatophytes using a moisture-proof envelope which is substantially translucent or transparent comprising the steps of:

locating and identifying undesirable phreatophytes;

closely enveloping the foliage and stems of the phreatophyte above ground in the envelope so as to essentially enclose that portion and isolate the immediate environment of the portion of the phreatophyte above ground from the ambient atmosphere so that such phreatophyte by transpiration raises the moisture level of such isolated immediate environment above its survival level;

maintain such isolation for a sufficient time to irreversibly reverse the life cycle of the phreatophyte, causing it to die.

2. The method of stopping the growth of *tamarix pentandra* (salt cedar) employing the steps of claim 1, wherein the additional step of: removing the envelope for reuse in stopping the growth of another *tamarix pentandra*, is practiced after step (c) above.

3. The method of claim 2 wherein the envelope is maintained about the above-ground stems of the *tamarix pentandra* for at least five days during the growing season for that plant.

4. A method of preserving water in the water table of an arid area infested by phreatophytes, using a plurality of envelopes, comprising the steps of:

locating and marking phreatophytes over the area;

closely enveloping the foliage and stems of a significant portion of such phreatophytes in the area with envelopes that are at least translucent to light and are substantially moisture-proof to isolate the immediate environment of the portion of each phreatophyte above ground from the ambient atmosphere such that each phreatophyte by transpiration will then raise the moisture level of such isolate immediate environment above its own survival level;

maintaining such isolation for a sufficient time to irreversibly reverse the life cycle of the phreatophytes, causing them to die off.

5. The method of claim 4 wherein at least some of the envelopes employed are: reused after the third step of claim 1 and reused in accordance with the second and third steps of claim 1 on other phreatophytes in the area.

6. The method of claim 5 wherein said method is repeatedly applied to different sub-areas of a river basin to eradicate *tamarix pentandra* (salt cedar) therefrom.

* * * * *